United States Patent
Calvert

(10) Patent No.: US 7,204,927 B2
(45) Date of Patent: Apr. 17, 2007

(54) SETTLING AIDS FOR SOLIDS IN HYDROCARBONS

(75) Inventor: Nancy R. Calvert, Kingwood, TX (US)

(73) Assignee: GE Betz, Inc., Trevose, PA (US)

(*) Notice: Subject to any disclaimer, the term of this patent is extended or adjusted under 35 U.S.C. 154(b) by 531 days.

(21) Appl. No.: 10/289,875

(22) Filed: Nov. 7, 2002

(65) Prior Publication Data

US 2004/0089590 A1   May 13, 2004

(51) Int. Cl.
*C07C 7/10*   (2006.01)

(52) U.S. Cl. .................. 208/251 R; 585/833; 585/860; 585/862; 585/864; 585/866

(58) Field of Classification Search ............ 208/251 R; 585/833, 860, 862, 864, 866
See application file for complete search history.

(56) References Cited

U.S. PATENT DOCUMENTS

| 5,476,988 A | 12/1995 | Hart et al. |
| 5,593,572 A | 1/1997 | Hart |
| 5,681,451 A | 10/1997 | Hart |

*Primary Examiner*—Tam M. Nguyen
(74) *Attorney, Agent, or Firm*—Duane Morris LLP

(57) ABSTRACT

A treatment for accelerating the settling of finely divided solids in hydrocarbon fluids, including adding to the hydrocarbon a sufficient settling amount of a combination of at least two of (a) a quaternary fatty ammonium compound, (b) a hetero-atom punctuated fatty polymer and (c) an alkylphenol-formaldehyde resin alkoxylate.

19 Claims, No Drawings

SETTLING AIDS FOR SOLIDS IN HYDROCARBONS

FIELD OF THE INVENTION

The present invention relates to treatments for accelerating settling of solids in hydrocarbon fluids. The treatments of the present invention are particularly effective at accelerating the settling of FCC catalyst fines in an oil slurry.

BACKGROUND OF THE INVENTION

Unrefined hydrocarbons such as crude oil, resids and bottom streams often contain finely divided solid matter, which often must be removed prior to further use or processing. These solids can include solids of a soil-like nature, finely divided silicas, clays, silt and coke, and metal oxide and sulfide corrosion solids. These solids may also include traces of metal particles such as lead, nickel, chromium and the like, and salts thereof.

For instance, fluid catalytic cracker (FCC) units use a fluidized bed of zeolite type aluminosilicate clay particles to crack heavy petroleum fractions into lighter fractions at elevated temperatures. The catalyst is eventually deactivated by poisoning or coking. These spent fines must be removed from the FCC on a continual basis so that slurry containing fresh catalyst can be added.

Some of this slurry oil containing the spent fines is then typically settled in tankage, though hydrocyclones are sometimes used to accelerate the separation process. Both native and synthetic components of the slurry oil have a dispersant effect which retards the settling of the fines.

The present inventor has discovered that a combination of certain chemical agents, when added to the slurry oil, have an anti-dispersant or coagulant effect which accerlates the settling process. This produces a cleaner decant oil (typically <0.05 wt % ash) in a shorter period of time, and can then be sold as carbon black feedstock or residual fuel oil.

DETAILED DESCRIPTION OF THE INVENTION

The present invention relates to compositions and methods for accelerating the settling of finely divided solids in hydrocarbon fluids, the methods comprising adding to said hydrocarbons an effective settling amount of a combination of at least two of (a) a quaternary fatty ammonium compound, (b) a hetero-atom punctuated fatty polymer and (c) an alkylphenol-formaldehyde resin alkoxylate.

The quaternary fatty ammonium compounds are generally quaternary ammonium compounds having the formula:

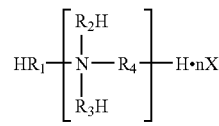

where $R_1$, $R_2$, $R_3$ and $R_4$ can be —$R_5$—, —($R_5$O)$_m$—, or

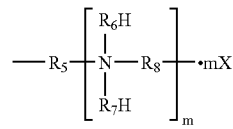

where $R_5$, $R_6$, $R_7$ and $R_8$ can be $C_1$ to $C_{30}$ alkylene, alkenylene, or alkylarylidene, and m is 1–25, X is a halide, sulfate, nitrate, phosphate or carboxylate anion, and n is 1–50.

The particular quaternary fatty ammonium compounds of the present invention are effective at accelerating settling of finely divided solids, particularly FCC catalyst fines. These compounds include, but are not limited to methyl quaternary amine ethoxylates such as tallow triethoxyl quaternary amine acetate and a hydrogenated $C_{18}$ methyl chloride quaternary amine with 15 moles ethylene oxide, as described in U.S. Pat. No. 5,476,988, herein incorporated by reference.

By "hetero-atom punctuated fatty polymers" it is meant a polymer of MW $10^3$ to $10^6$ in which $C_{10}$–$C_{30}$ alkyl or alkenyl "fatty" hydrocarbon groups are separated in some way (i.e., punctuated) by hetero-atom (non-C,H) containing groups such as ethers, esters, amides, amines, phenols, heterocycles, thio and halo carbons, and the like, which are smaller in size than the fatty groups. Additional details regarding these particular compounds are found in U.S. Pat. No. 5,593,572, also herein incorporated by reference.

As to the alkylphenol-formaldehyde resin alkoxylate component of the present invention, such materials generally have molecular weights in the range of from about 500 to about 5,000, with a range of about 1,000 to about 2,500 preferred. The alkyl group may be linear or branched, and have from about 1 to about 24 carbon atoms, with a range of from about 4 to about 9 preferred. The alkoxy group has about 2 to about 4 carbon atoms, with 2 preferred; the alkoxylation comprises about 20 to 80 percent by weight of the molecule, with about 50 percent preferred. Additional details regarding this component of the present invention are found in U.S. Pat. No. 5,681,451, also herein incorporated by reference.

DESCRIPTION OF THE PREFERRED EMBODIMENTS

The present invention relates to a chemical treatment to settle solids in a liquid matrix. The liquid matrix may be either organic, or a mix of organic and aqueous matrices. The chemicals used to settle solids are a combination of at least two of the following materials: quaternary ammonium chemicals, vinyl acetate copolymers and alkylphenol formaldehyde chemicals.

In the testing of the present invention, solids settling efficiency was determined by bottle testing. The process fluid was heated before mixing; after appropriate mixing to homogenize the fluid, 100 ml was poured into 150 ml glass bottles. Approximately 20 percent total raw materials in highly aromatic naptha (HAN) comprised the starting spiking solution. Cosolvents that may be used include up to 10 percent of the following: kerosene, heptane, n-butanol, hexylene glycol, and/or xylene. Table 1 shows a preferred composition of various materials of the present invention, each as 20 percent total raw material blend.

TABLE 1

Experimental Formulas

| | Composition A Ethoquads are in 1:1 ratio | | Composition B Vinyl Acetate Copolymers (Elvax to Paraflow is 1:1 ratio) | | Composition C Alkyl phenol formaldehyde |
|---|---|---|---|---|---|
| | Components | | | | |
| | Ethoquad 18/25[1] | Ethoquad T/13-50[2] | Elvax 210[3] | Paraflow 185[4] | Baker 7935[5] |
| | Percent of raw materials in each formula | | | | |
| Composition A | 10 | 10 | | | |
| Composition B | | | 10 | 10 | |
| Composition C | | | | | 20 |
| Composition A + B | 5 | 5 | 5 | 5 | |
| Composition A + C | 5 | 5 | | | 10 |
| Composition B + C | | | 5 | 5 | 10 |
| Composition A + B + C | 3.3 | 3.3 | 3.3 | 3.3 | 6.7 |

In all tables:
[1] Ethoquad ® 18/25: PEG-15 stearmonium chloride
[2] Ethoquad ® T/13-50: Tris (2-hydroxyethyl) tallowalkyl ammonium acetate
[3] Elvax ® 210: Ethylene/vinyl acetate copolymer
[4] Paraflow 185: Dialkyl fumurate/vinyl acetate copolymer
[5] Baker 7935: Alkoxylated alkylphenol formaldehyde In the further testing of the present invention, as shown in Table 2 below, a blank and a control were tested in each run. The blank had no added solvent or additive. The control sample was dosed with the appropriate amount of the solvent, in order to mimic solvent addition in additized tested fluids. The samples were mixed by an automatic shaker; after mixing was complete, the samples were placed into a hot bath for a determined amount of time. After this predetermined residence time in the hot bath, the samples had the top 50% of the particular sample withdrawn and filtered. The bottom portion was then filtered, and the container rinsed out with appropriate solvent. The filter papers were then placed in a furnace at 900° F. for approximately 9 hours.

As shown below, the results of the testing were recorded as percents settling from the following formula: [bottom ash (b)−top ash (t)]÷[bottom ash (b)+top ash (t)]. The results demonstrated the efficacy of the treatment of the present invention.

TABLE 2

Fluid processed: FCCU Slurry

| Treatment | % Settling (b − t)/(b + t) | Treatment | % Settling |
|---|---|---|---|
| Blank | 79.5% | Composition A + B 44 ppm | 87.6% |
| Control 87 ul HAN | 77.3% | Composition A + B 88 ppm | 89.1% |
| Composition A 44 ppm | 83.8% | Composition A + C 44 ppm | 90% |
| Composition A 88 ppm | 84.2% | Composition A + C 88 ppm | 90.9% |
| Composition A 176 ppm | 86.6% | Composition A + B + C 44 ppm | 90.2% |
| Composition A 264 ppm | 90.4% | Composition A + B + C 88 ppm | 92.1% |
| Composition A 352 ppm | 88.4% | | |
| Composition B 44 ppm | 78.0% | | |
| Composition B 88 ppm | 77.6% | | |
| Composition B 176 ppm | 82.2% | | |
| Composition C 44 ppm | 81.8% | | |
| Composition C 88 ppm | 81.8% | | |
| Composition C 176 ppm | 79.2% | | |

TABLE 3

Fluid tested: FCCU Slurry

| Chemical Composition | Product Dose (ppm) | % Settled |
|---|---|---|
| A + C | 100 | 94.7% |
| A | 100 | 92.5% |
| C | 100 | 86.6% |
| A + B + C | 100 | 85.3% |
| A + B | 100 | 83.0% |
| B + C | 100 | 84.5% |
| Control | | 78.5% |
| Blank | | 75.8% |
| B | 100 | 76.4% |

TABLE 4

Fluid Processed: Combined Gas/Oil

| Blend Composition Wt. % ratios | Dosage Ppm | % Settled (b − t)/(b + t) |
|---|---|---|
| B + C | 50 | 77.1% |
| A + B | 50 | 48.4% |

TABLE 4-continued

Fluid Processed: Combined Gas/Oil

| Blend Composition Wt. % ratios | Dosage Ppm | % Settled (b − t)/(b + t) |
|---|---|---|
| Blank | | 30.3% |
| Control | | 23.0% |
| A + B + C | 50 | 14.0% |
| A | 50 | 3.1% |
| B | 50 | 1.6% |
| C | 50 | −14.0% |
| A + C | 50 | −74.5% |

TABLE 5

Fluid tested: Used lube oil

| Composition Chemical components | Product Dose ppm | % Settled (b − t)/(b + t) |
|---|---|---|
| A + B + C | 650 | 30% |
| A + C | 650 | 28% |
| B | 650 | 27% |
| C | 650 | 24% |
| A | 650 | 17% |
| B + C | 650 | 7% |
| Control | | −1% |
| A + B | 650 | −24% |
| Blank | | −47% |

What is claimed is:

1. A method for accelerating the settling of finely divided oil and water insoluble solids in hydrocarbon fluids comprising adding to said hydrocarbon fluids from about 44–88 ppm of a combination of at least two of
   (a) a quaternary fatty ammonium compound having the formula

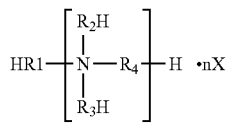

where $R_1$, $R_2$, $R_3$ and $R_4$ can be —$R_5$—, —$(R_5O)_m$—, or

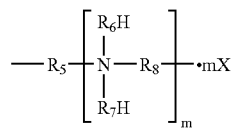

where $R_5$, $R_6$, $R_7$ and $R_8$ can be $C_1$ to $C_{30}$ alkylene, alkenylene, or alkylarylidene, and m is 1–25, X is a halide, sulfate, nitrate, phosphate or carboxylate anion, and n is 1–50;
   (b) a hetero-atom punctuated $C_{10}$–$C_{30}$ alkyl or alkenyl polymer having a molecular weight of from $10^3$ to $10^6$, wherein said alkyl or alkenyl groups are separated by smaller hetero-atom groups; and
   (c) an alkylphenol-formaldehyde resin alkoxylate.

2. The method as recited in claim 1 wherein said fatty ammonium compound is a methyl quaternary amine ethoxylate.
3. The method as recited in claim 2 wherein said methyl quaternary amine ethoxylate is selected from the group consisting of tallow triethoxyl quaternary amine acetate and hydrogenated $C_{18}$ methyl chloride quaternary amine with 15 moles ethylene oxide.
4. The method as recited in claim 1 wherein said quaternary fatty ammonium compound is a tallow amine alkyl quaternary compound.
5. The method as recited in claim 4 wherein said tallow alkyl quaternary compound is selected from the group consisting of tallow aminopropylamine pentamethyl dichloride, tallow diaminopropyl heptamethyl trichloride and $C_{18}$ aminopropylbisaminopropylamine nonamethyl tetrastearate.
6. The method as recited in claim 1 wherein said finely divided solids are fluid catalytic cracker catalyst fines.
7. The method as recited in claim 1 wherein said hydrocarbon is a fluid catalytic cracker slurry.
8. The method as recited in claim 1 wherein said hydrocarbon is selected from the group consisting of crude oils and fractions or residuals of crude oils boiling over about 400° F.
9. The method as recited in claim 1 wherein said polymer is an ethylene-vinylacetate copolymer wherein said alkenyl groups are blocks of polyethylene of at least 5 units long and said vinylacetate groups are not in blocks.
10. The method as recited in claim 1 wherein said polymer is a dialkylflimerate-vinylacetate copolymer.
11. A method for accelerating the settling of finely divided oil and water insoluble solids in hydrocarbon fluids comprising adding to said hydrocarbon fluids from about 44–88 ppm of a combination of
   (a) a quaternary fatty ammonium compound having the formula

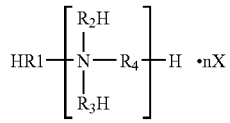

where $R_1$, $R_2$, $R_3$ and $R_4$ can be —$R_5$—, —$(R_5O)_m$—, or

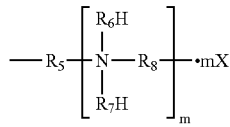

where $R_5$, $R_6$, $R_7$ and $R_8$ can be $C_1$ to $C_{30}$ alkylene, alkenylene, or alkylarylidene, and m is 1–25, X is a halide, sulfate, nitrate, phosphate or carboxylate anion, and n is 1–50;
   (b) a hetero-atom punctuated $C_{10}$–$C_{30}$ alkyl or alkenyl polymer having a molecular weight of from $10^3$ to $10^6$, wherein said alkyl or alkenyl groups are separated by smaller hetero-atom groups; and
   (c) an alkylphenol-formaldehyde resin alkoxylate.
12. The method as recited in claim 11 wherein said polymer is a blend of hetero-atom punctuated fatty polymers.

13. The method as recited in claim 12 wherein said blend of polymers is a blend of $C_{17}$ poly(ethylene)-vinylacetate $10^5$ MW copolymer and di-$C_{22}$-alkyiflimerate-vinylacetate 2:1, $3\times10^4$ MW copolymer.

14. The method as claimed in claim 11 wherein said alkylphenol-formaldehyde resin alkoxylate has a molecular weight range of about 500 to about 5,000.

15. The method as claimed in claim 11 wherein said alkylphenol-formaldehyde resin alkoxylate has a molecular weight range of about 1,000 to about 2,500.

16. The method as claimed in claim 11 wherein said alkylphenol-formaldehyde resin alkoxylate has an alkyl group range of 1 to about 24 carbon atoms.

17. The method as claimed in claim 11 wherein said alkylphenol-formaldehyde resin alkoxylate has alkoxy groups ranging from about 2 to about 4 carbon atoms each.

18. The method as claimed in claim 11 wherein said alkoxylation comprises 20 to 80% of the weight of said alkylphenol-formaldehyde resin alkoxylate.

19. The method as claimed in claim 11 wherein said alkylphenol-formaldehyde resin alkoxylate is a base catalyzed nonylphenolic resin ethoxylate wherein the ethoxylation comprises about 50% of the weight of said ethoxylate.

\* \* \* \* \*